(12) United States Patent
Schafrik et al.

(10) Patent No.: US 6,968,730 B2
(45) Date of Patent: Nov. 29, 2005

(54) NON-DESTRUCTIVE EVALUATION OF THERMAL BARRIER COATINGS IN GAS TURBINE ENGINES

(75) Inventors: Robert E. Schafrik, Cincinnati, OH (US); Matthew B. Buczek, Fairfield, OH (US); Ramgopal Darolia, West Chester, OH (US); Steven R. LeClair, Dayton, OH (US); John F. Maguire, Helotes, TX (US); William C. Fitzgerald, Medway, OH (US)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 10/439,670

(22) Filed: May 16, 2003

(65) Prior Publication Data

US 2004/0226351 A1 Nov. 18, 2004

(51) Int. Cl.[7] .......................... H01J 37/20; G01B 7/34
(52) U.S. Cl. ....................... 73/105; 324/637; 250/306; 250/307
(58) Field of Search .......................... 324/637; 73/105; 250/306, 307

(56) References Cited

U.S. PATENT DOCUMENTS

| | | | |
|---|---|---|---|
| 5,488,305 A | * | 1/1996 | Bloom et al. ............... 324/537 |
| 5,815,124 A | | 9/1998 | Manasson et al. |
| 5,821,410 A | | 10/1998 | Xiang et al. |
| 5,900,618 A | | 5/1999 | Anlage et al. |
| 5,936,237 A | | 8/1999 | van der Weide |
| 5,960,632 A | | 10/1999 | Abuaf et al. |
| 6,173,604 B1 | | 1/2001 | Xiang et al. |
| 6,597,185 B1 | * | 7/2003 | Talanov et al. ............. 324/638 |

OTHER PUBLICATIONS

Stranick et al. (http://www.cstl.nist.gov/div837/837.03/highlite/uwaves2000.htm, Dec. 2000).*

Xiang et al., "Nondestructive Imaging of Dielectric-Constant Profiles and Ferroelectric Domains with a Scanning-Tip Microwave Near-Field Microscope", Science Jun. 27, 1997, vol. 276, pp. 2004-2006.*

Xiang et al. "Scanning tip microwave near-field microscope", Appl. Phys. Lett., Jun. 10, 1996, vol. 68, No. 24, pp. 3506-3508.*

Xiang et al. "Tip-sample distance feedback control in a scanning evanescent microscope", Appl. Phys. Lett., May 3, 1999, vol. 74, No. 18, pp. 2696-2698.*

Rosner et al. "High-frequency near-field microscopy", Rev. Sci. Instrum., vol. 73, No. 7, Jul. 2002, pp. 2505-2525.*

Tabib-Azar et al. "Transient thermography using evanescent microwave microscope", Rev. Sci. Instrum., vol. 70, No. 8, Aug. 1999, pp. 3387-3390.*

Tabib-Azar et al. "Novel physical sensors using evanescent microwave probes", Rev. Sci. Instrum., vol. 70, No. 8, Aug. 1999, pp. 3381-3386.*

Tabib-Azar et al. "Nondestructive superresolution imaging of defects and nonuniformities in metals, semiconductors, dielectrics, composites, and plants using evanescent microwaves", Rev. Sci. Instrum., vol. 70, No. 6, Jun. 1999, pp. 2783-2792.*

* cited by examiner

*Primary Examiner*—Michael Cygan
(74) *Attorney, Agent, or Firm*—Armstrong Teasdale LLP; William Scott Andes

(57) ABSTRACT

A non-destructive method of detecting subsurface defects in thermal barrier coatings applied to gas turbine engine components is provided. In an exemplary embodiment, the method includes positioning a evanescent microwave microscope probe adjacent a turbine component surface coated with a thermal barrier coating, and scanning the thermal barrier coating by moving at least one of the evanescent microwave microscope probe and the component surface in relation to one another in an x-y plane while maintaining a predetermined distance between the probe and the thermal barrier coating constant.

15 Claims, 3 Drawing Sheets

NON-DESTRUCTIVE EVALUATION OF THERMAL BARRIER COATINGS IN GAS TURBINE ENGINES

BACKGROUND OF THE INVENTION

This invention relates generally to non-destructive examinations of gas turbine engine components, and more particularly to non-destructive evaluations of thermal barrier coatings applied to gas turbine components.

A gas turbine engine includes a compressor for compressing air which is channeled to a combustor and mixed with a fuel, wherein the mixture is ignited for generating hot combustion gases. The combustion gases are channeled to a turbine, which extracts energy from the combustion gases for powering the compressor, as well as producing useful work to propel an aircraft in flight or to power a load, such as an electrical generator. Increased efficiency in gas turbine engines is facilitated at least in part by an increase in the operating temperature of the combustor. A limitation on the operating combustor temperature may be a temperature limitation of combustor liner material.

A thermal barrier coating can be applied to inner surfaces of the combustor liner or other components of the turbine, for example, blades and vanes, for providing thermal insulation against combustion gases. Thermal barrier coatings facilitate reducing an amount of cooling air required for a given combustion gas temperature, or allow an increase in a combustion gas temperature for increasing efficiency of the engine. See, for example, U.S. Pat. No. 5,960,632. Typically the thermal barrier coating is applied uniformly across the turbine component with a thickness of 0.01 inches or less.

Thermal barrier coating systems can include an inner bond coat applied to the metal substrate, an outer thermal insulating layer that includes one or more ceramic materials, and a thin intermediate alumina layer located between the bond coat and the thermally insulating layer to promote adhesion of the thermally insulating layer. The alumina layer is formed during processing and is commonly referred to as a thermally grown oxide. Known thermal barrier coatings include a zirconia stabilized with yttria thermal insulating top layer and a metallic overlay and/or diffusion aluminide bond coat.

Sometimes spalling of the outer thermal insulating layer can occur at the intermediate layer/insulating layer interface or at the intermediate/bond coat interface as a result of coating defects and/or a build-up of stresses at these interfaces. The presence of residual compressive stress in thermal barrier coatings are closely linked to thermal barrier coating adhesion through testing and engine service. Further, it has been shown that compositional and/or microstructual variations in a thermal barrier coating can lead to significant changes/differences in the thermal conductivity of the thermal barrier coating.

Standard non-destructive testing techniques, for example, through transmission ultrasound and X-ray diffraction may be unable to assess thermal barrier coating integrity due to density differences between the substrate and the coating. Known residual stress measurement techniques, such as X-ray diffraction, have limited use in determining thermal barrier coating quality because of the difficulty in penetrating through the thermal insulating layer to the intermediate layer. The intermediate thermally grown oxide layer is also very thin, typically about 1 micron, and therefore is very difficult to characterize by X-ray diffraction and other conventional techniques, for example, neutron diffusion. Another non-destructive measurement method which can measure residual stress proximate an intermediate thermally grown oxide layer in a multi-layer thermal barrier coating directs a laser beam through the outer ceramic thermal insulating layer such that the laser beam illuminates the intermediate layer in a manner to cause species present in the intermediate layer to fluoresce, measuring the frequency of the light or photons emitted by the fluorescing species, and comparing the measured frequency of the intermediate layer to the frequency shift determined on like material under controlled stress states to determine a representation of relative residual stress in the coating. See for example, U.S. Pat. No. 6,072,568. However, these methods are limited and only indirectly measure some properties of the thermal barrier coating and do not provide detailed morphological information needed to asses thermal barrier coating quality.

BRIEF DESCRIPTION OF THE INVENTION

In one aspect, a non-destructive method of detecting subsurface defects in thermal barrier coatings applied to gas turbine engine components is provided. The thermal barrier coating includes an inner bond layer applied to a surface of the turbine component, an outer thermal insulating layer, and an intermediate layer. The method includes positioning a evanescent microwave microscope probe adjacent a turbine component surface coated with a thermal barrier coating, and scanning the thermal barrier coating by moving at least one of the evanescent microwave microscope probe and the component surface in relation to one another in an x-y plane while maintaining a predetermined distance between the probe and the thermal barrier coating constant.

In another aspect, a non-destructive method of detecting subsurface defects in thermal barrier coatings applied to gas turbine engine components utilizing an evanescent microwave microscope system comprising a probe is provided. The thermal barrier coating includes an inner bond layer applied to a surface of the turbine component, an outer thermal insulating layer, and an intermediate layer. The method includes positioning an evanescent microwave microscope probe adjacent a turbine component surface coated with a thermal barrier coating, and scanning the thermal barrier coating by moving at least one of the evanescent microwave microscope probe and the component surface in relation to one another in an x-y plane while maintaining a distance between the probe and the thermal barrier coating constant. The evanescent microwave microscope probe includes a metal probe tip having an end sharpened to a point and a conductive surface of at least one of silver, gold, platinum, palladium and alloys thereof.

In another aspect, an evanescent microwave microscope probe is provided. The probe includes a center conductor, an insulator covering the center conductor, an outer shield covering the insulating covering, with the outer shield having an aperture in an end wall of the shield, and a probe tip connected to the center conductor. The probe tip includes a distal end sharpened to a point and a conductive surface of at least one of silver, gold, platinum, palladium, and alloys thereof.

DETAILED DESCRIPTION OF THE INVENTION

Non-destructive examination of thermal barrier coatings applied to gas turbine engine components using evanescent microwave microscopy is described in detail below. Evanescent microwave microscopy is used for imaging scans of thermal barrier coatings with resolutions of $\lambda/1000$ or better, where $\lambda$ is the wavelength of microwave energy in free space. In evanescent microwave field imaging, the fields are intentionally confined or restricted to regions that are significantly smaller than their wavelength. The fields in these regions are restricted and are unable to travel freely, so they evanesce or attenuate exponentially. These decaying fields are employed to scan over material objects much smaller than the wavelength of the traveling field exciting resonance in the microwave probe. This methodology enables the classical limit, i.e., Abbe barrier, to be exceeded. This limit on the spatial resolution or minimum resolvable size is ½ of the wave length $\lambda$ of the electromagnetic excitation fields. To recover a signal, all the spatial frequency components contained within that signal are recovered. The basic principal is to closely scan in two or three dimensions a point like field source of a material object so that the evanescent field is powerful enough to interact with the properties of the material, such as a thermal barrier coating. This results in an image with resolved features significantly smaller than the Abbe limit and governed by the characteristic size and conductivity of the probe tip.

Figure 1:
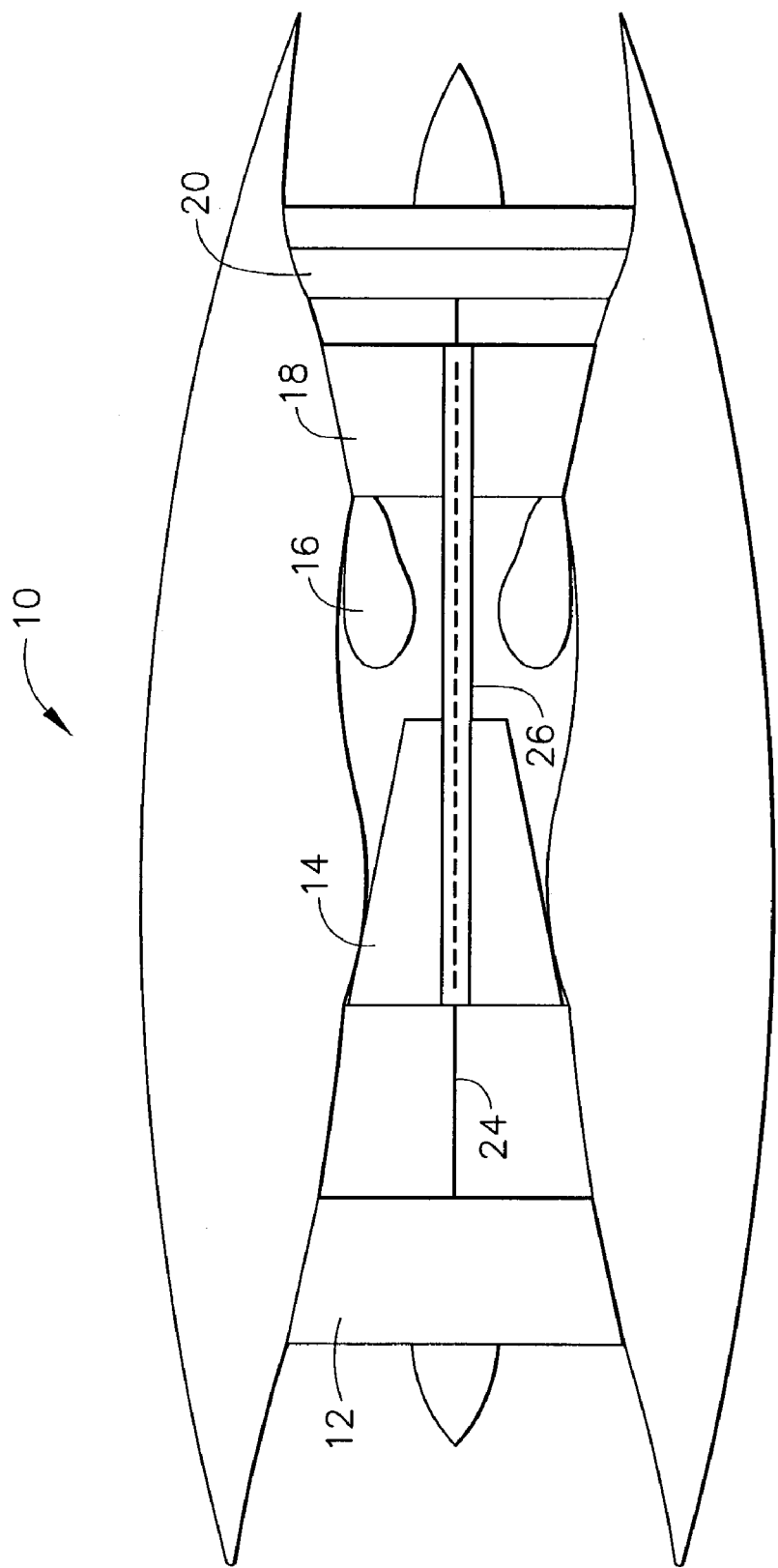
FIG. 1 is a schematic illustration of a gas turbine engine.

Referring to the drawings, FIG. 1 is a schematic illustration of an exemplary gas turbine engine 10 including a low pressure compressor 12, a high pressure compressor 14, and a combustor assembly 16. Engine 10 also includes a high pressure turbine 18, and a low pressure turbine 20. Compressor 12 and turbine 20 are coupled by a first shaft 24, and compressor 14 and turbine 18 are coupled by a second shaft 26.

In operation, air flows through low pressure compressor 12 from an inlet of engine 10 and compressed air is supplied from low pressure compressor 12 to high pressure compressor 14. Compressed air is then delivered to combustor assembly 16 where it is mixed with fuel and ignited. The combustion gases are channeled from combustor 16 to drive turbines 18 and 20.

Figure 2:
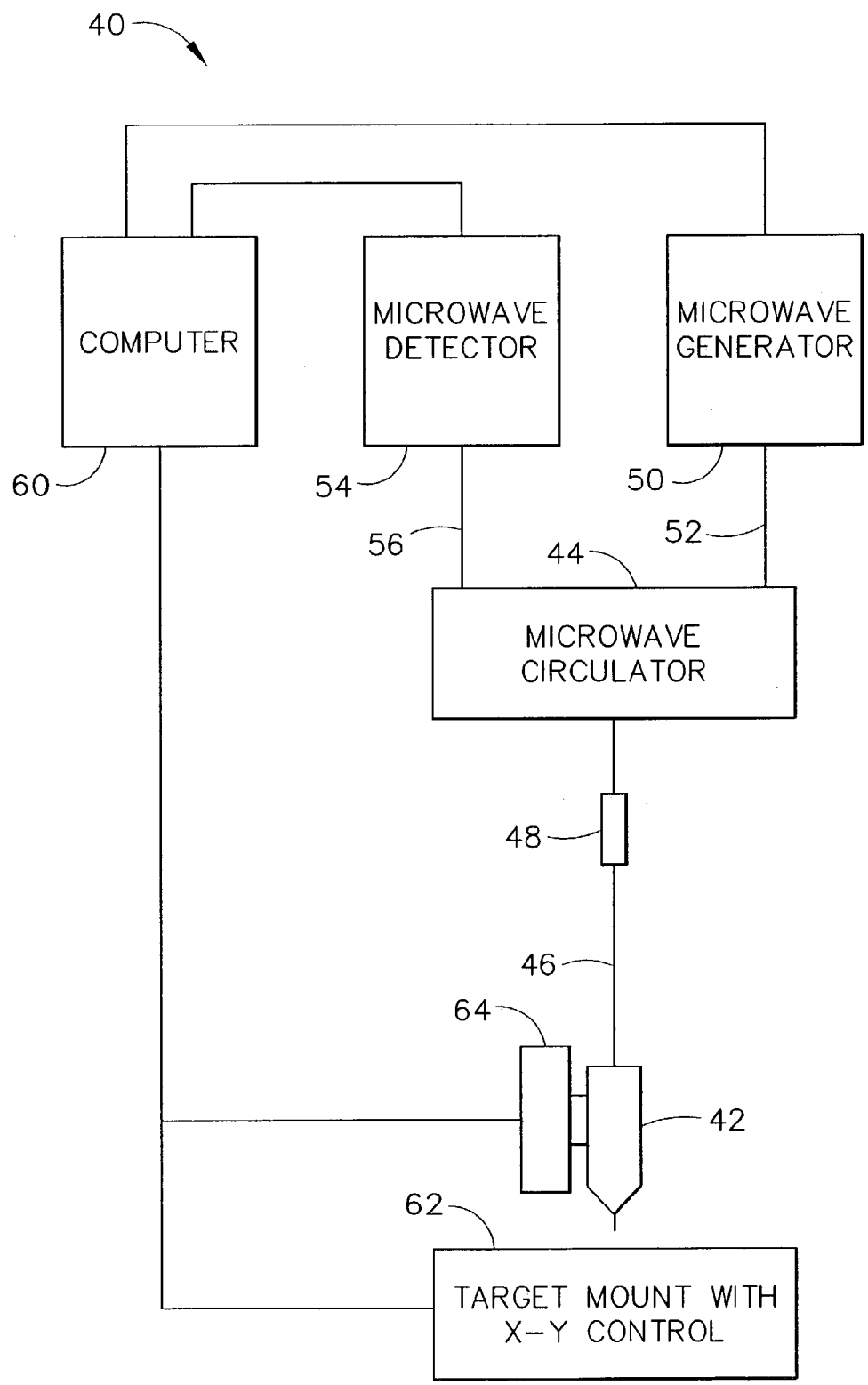
FIG. 2 is a schematic illustration of the various components of an evanescent microwave microscope with probe.

FIG. 2 is a schematic illustration of an exemplary embodiment of the various components of an evanescent microwave microscope system 40 that includes an evanescent microwave probe 42. Probe 42 is capacitively coupled to a microwave circulator 44 by a coaxial cable 46 and a coupling capacitor 48. Coaxial cable 46 can also be referred to as a transmission line 46. Capacitor 48 is variable so the range of resonance can be tuned. A microwave generator 50 is connected to microwave circulator 44 by a coaxial cable 52. Any suitable microwave generator can be used, for example, sweep generator HP8350B commercially available from Hewlett Packard. A microwave detector 54 is also connected to microwave circulator 44 by a coaxial cable 56. Microwave detector 54, for example, a square law crystal microwave detector, permits a frequency modulated signal to be extracted from the microwave excitation signal. The frequency modulated signal is proportional to the magnitude of the reflected microwave radiation captured by probe 42. A computer 60 is operatively connected to microwave generator 50 to control and monitor generator 50. Computer 60 is also operatively coupled to detector 54 to collect scan data and perform data acquisition functions.

A target mount 62 with X-Y axis control supports the component that is to be examined. Probe 42 is mounted on a Z-axis linear actuator 64 to provide controlled spacing of probe 42 and the part to be examined. Computer 60 is also operatively connected to target mount 62 and linear actuator 64 to precisely control the X-Y axis movement of target mount 62 and the Z-axis movement of actuator 64.

Figure 3:
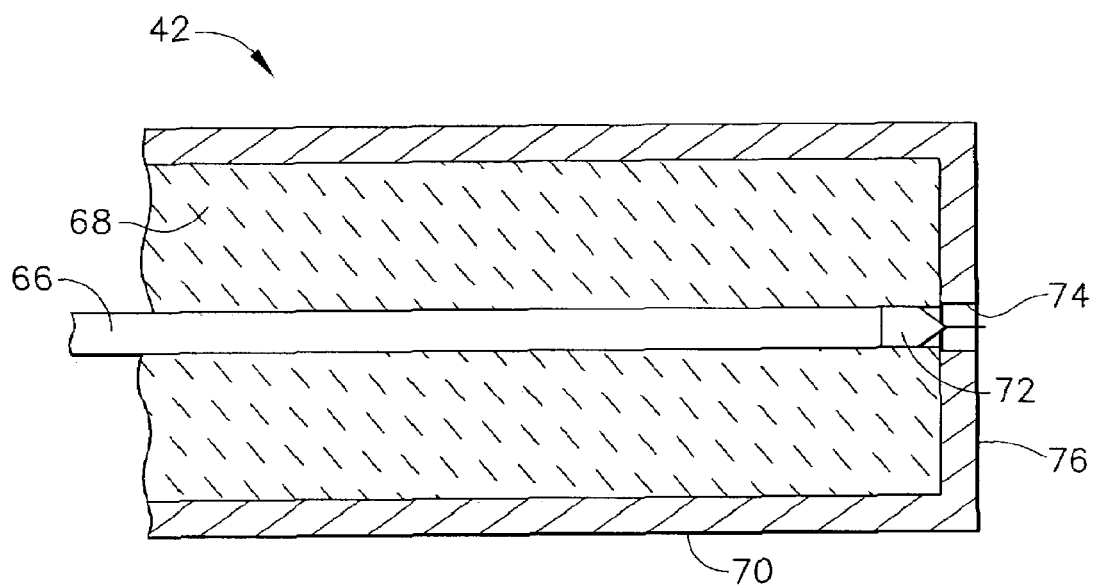
FIG. 3 is a schematic illustration of the evanescent microwave microscope probe shown in FIG. 2.

FIG. 3 is a schematic illustration of an exemplary embodiment of evanescent microwave microscope probe 42. Probe 42 includes a center conductor 66 surrounded by an insulator 68 and an outer shield 70. An end portion (or tip) 72 of center conductor 66 is sharpened to a point and is plated with layer of at least one of silver, gold, platinum, palladium and alloys thereof. In the exemplary embodiment, end portion 72 is plated with silver. In alternate embodiments, end portion 72 is fabricated from silver gold, platinum, palladium or alloys thereof. The higher conductivity of silver, gold, platinum, and palladium increases the quality factor Q of probe 42. High Q values promote high sensitivity of probe 42. Tip 72 of center conductor 66 extends through an aperture 74 in an end wall 76 of outer shield 70.

Microwave probe 42 is a resonator type probe that is based on an open-transmission line. Such a resonator probe behaves as a parallel resonant circuit when the length of transmission line 46 is a multiple of $\lambda/2$, where $\lambda$ is the wavelength of microwave energy in free space. The overall length of transmission line 46 is selected to give multiple resonances in the bandwidth of microwave generator 50.

When a sample object is placed adjacent probe tip 72, the reflection coefficient of probe 42 changes. Both the resonance frequency $f_0$ and the quality factor Q of probe 42 are affected by the presence of the sample. The amount of change in the resonance (df and dQ) depends primarily on the microwave properties of the sample as well as the distance d between tip 72 and the sample, and the effective area $A_{eff}$ of probe tip 72. Keeping $A_{eff}$ and d constant, probe 42 is scanned over the sample and variations in the microwave properties of the sample are mapped. Changes in the substrate surface (ground plane), thickness, dielectric constant, and electrical conductivity affect the reflection coefficient. These properties are directly related to the quality, for example, defects, coating separation, or the void content, of a thermal barrier coating and are also indicative of the thermal conductivity of the thermal barrier coating.

Figure 4:
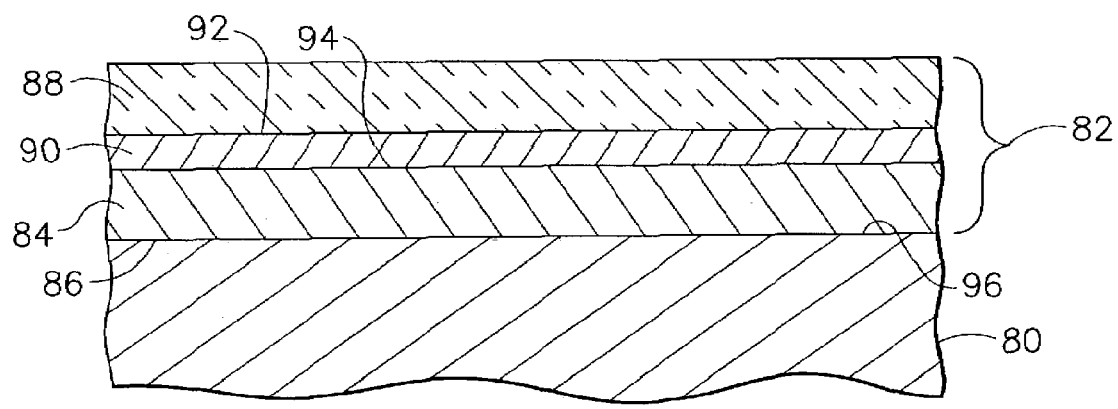
FIG. 4 is a schematic sectional illustration of a gas turbine engine component with a thermal barrier coating.

FIG. 4 is a schematic sectional view of a gas turbine engine component 80 with a thermal barrier coating 82. Thermal barrier coating 82 includes an inner bond coat 84 applied to a surface 86 of component 80, an outer thermal insulating layer 88 that includes one or more ceramic materials, and a thin intermediate alumina layer 90 located between bond coat 84 and thermally insulating layer 88 to promote adhesion of thermally insulating layer 88. Alumina layer 90 is formed during processing and is commonly referred to as a thermally grown oxide. Any suitable thermal barrier coatings can be used, for example thermal barrier coatings that include a zirconia stabilized with yttria thermal insulating top layer 88 and a metallic overlay and/or diffusion aluminide bond coat 84

When scanning component 80 with probe 42, of particular interest are defects that can occur at an interface 92 between outer thermal insulating layer 88 and intermediate layer 90, defects that can occur at an interface 94 between intermediate layer 90 and bond coat 84, and defects that can occur at an interface 96 between bond coat 84 and surface 86 of component 80.

To scan component 80 to detect possible subsurface defects in thermal barrier coating 82, component 80 is mounted on target mount 62. The distance between component 82 and probe tip 72 is set to a predetermined value by activating linear actuator 64. Component 80 is then scanned by moving component 80 in relation to probe 42 by using the X-Y axis control function of target mount 62. During the scanning of component 80, microwave generator 50 generates a microwave signal that is directed to probe 42 through microwave circulator 44. Detector 54 extracts frequency modulated signal data from the microwave excitation signal that is proportional to the magnitude of the reflected microwave radiation captured by probe 42. Computer 60 collects and process the detected scan data during the scanning process.

In an alternative embodiment, evanescent microwave probe 42 is a resonant cavity having an aperture, for example, a rectangular resonant cavity having an aperture of about 0.1λ. In another alternate embodiment, the resonant cavity is a cylindrical resonant cavity having a slot shaped aperture. A cylindrical resonant cavity can be sized to conform to the shape of turbine component 80 to increase measurement sensitivity and spatial resolution.

The above described evanescent microwave probe 42 permits detection of subsurface defects in thermal barrier coatings applied to gas turbine engine components. Field imaging scans of interface 92 between outer thermal insulating layer 88 and intermediate layer 90, interface 94 between intermediate layer 90 and bond coat 84, and interface 96 between bond coat 84 and surface 86 of component 80 can detect coating anomalies such as voids, lack of adhesion between coats, and spalling of coating 82 which are an important measure of the quality of thermal barrier coating 82.

An exemplary embodiment of an evanescent microwave probe is described above in detail. The apparatuses illustrated are not limited to the specific embodiments described herein, but rather, components of each may be utilized independently and separately from other components described herein.

While the invention has been described in terms of various specific embodiments, those skilled in the art will recognize that the invention can be practiced with modification within the spirit and scope of the claims.

What is claimed is:

1. A non-destructive method of detecting subsurface defects in thermal barrier coatings applied to gas turbine engine components, said method comprising:
   positioning an evanescent microwave microscope probe at a predetermined distance from a turbine component surface coated with a thermal barrier coating wherein the thermal barrier coating comprises an inner bond layer applied to a surface of the turbine component, an outer thermal insulating layer, and an intermediate layer;
   scanning the thermal barrier coating for compositional or microstructural variations in the thermal coating barrier by moving at least one of the evanescent microwave microscope probe and the component surface in an x-y plane while maintaining the predetermined distance between the probe and the thermal barrier coating constant; and
   calculating at least one of the thermal conductivity of the thermal barrier coating and the quality of the thermal barrier coating at each scan point.

2. A method in accordance with claim 1 wherein the evanescent microwave microscope probe comprises a metal probe tip having an end sharpened to a point and further comprises a conductive surface of at least one of silver, gold, platinum, palladium and alloys thereof, said positioning an evanescent microwave microscope probe adjacent a turbine component surface comprises positioning the sharpened probe tip a predetermined distance from the turbine component surface.

3. A method in accordance with claim 2 wherein a detector is coupled to the evanescent microwave microscope probe, said method further comprising detecting reflected microwave radiation with the detector coupled to the evanescent microwave microscope probe.

4. A method in accordance with claim 3 wherein the detector is coupled to a computer, said method further comprising sending detected reflected microwave radiation data to the computer.

5. A method in accordance with claim 4 further comprising generating graphical plots from detected reflected microwave radiation data showing the morphology of the thermal barrier coating.

6. A method in accordance with claim 1 wherein scanning the thermal barrier coating further comprises scanning an interface between the intermediate layer and the outer thermal insulating layer.

7. A method in accordance with claim 1 wherein scanning the thermal barrier coating further comprises scanning an interface between the intermediate layer and the inner bond layer.

8. A method in accordance with claim 1 wherein scanning the thermal barrier coating further comprises scanning an interface between the inner bond layer and the surface of the turbine component.

9. A non-destructive method of detecting subsurface defects in thermal barrier coatings applied to gas turbine engine components utilizing an evanescent microwave microscope system comprising a probe, said method comprising:
   positioning an evanescent microwave microscope probe at a predetermined distance from a turbine component surface coated with a thermal barrier coating, the thermal barrier coating comprising an inner bond layer applied to a surface of the turbine component, an outer thermal insulating layer, and an intermediate layer;
   scanning the thermal barrier coating for compositional or microstructural variations in the thermal coating barrier by moving at least one of the evanescent microwave microscope probe and the component surface in relation to one another in an x-y plane while maintaining the predetermined distance between the probe and the thermal barrier coating constant;
   wherein the evanescent microwave microscope probe comprises a metal probe tip having an end sharpened to a point and further comprises a conductive surface of at least one of silver, gold, platinum, palladium and alloys thereof; and
   calculating at least one of the thermal conductivity of the thermal barrier coating and the quality of the thermal barrier coating at each scan point.

10. A method in accordance with claim 9 wherein the evanescent microwave microscope system further comprises a detector coupled to the evanescent microwave microscope probe, and said method further comprises detecting reflected microwave radiation with the detector coupled to the evanescent microwave microscope probe.

11. A method in accordance with claim 10 wherein the evanescent microwave microscope system further comprises a computer coupled to the detector, and said method further comprises sending detected reflected microwave radiation data to the computer.

12. A method in accordance with claim 11 further comprising generating graphical plots from detected reflected microwave radiation data showing the morphology of the thermal barrier coating.

13. A method in accordance with claim 9 wherein scanning the thermal barrier coating further comprises scanning an interface between the intermediate layer and the outer thermal insulating layer.

14. A method in accordance with claim 9 wherein scanning the thermal barrier coating further comprises scanning an interface between the intermediate layer and the inner bond layer.

15. A method in accordance with claim 9 wherein scanning the thermal barrier coating further comprises scanning an interface between the inner bond layer and the surface of the turbine component.

* * * * *